Figure 1:
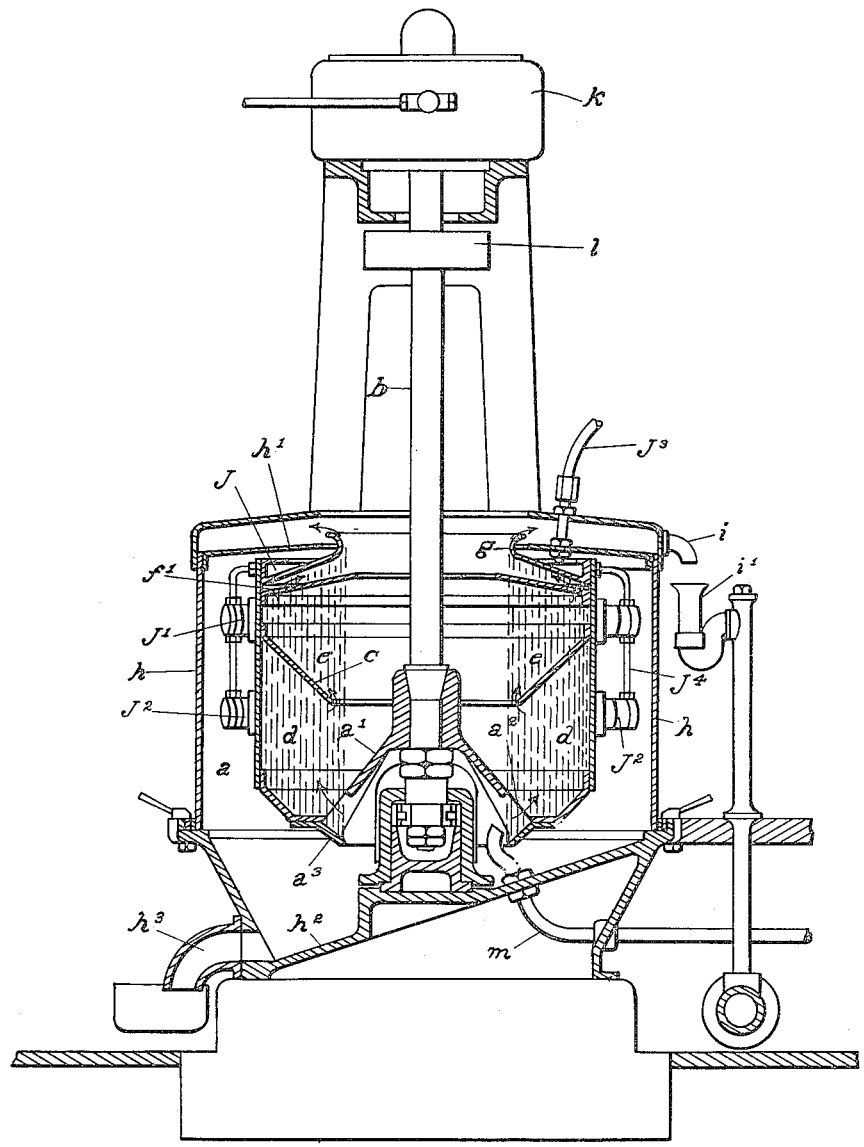

J. HAMILL.
SEPARATION OF IMPURITIES FROM LIQUIDS BY CENTRIFUGAL FORCE.
APPLICATION FILED MAR. 13, 1914.

1,224,164.

Patented May 1, 1917.

Witnesses
Marvin B. Davis
Ben R. Newcomb

Inventor
James A. Hamill
By B. Singer
Attorney

J. HAMILL.
SEPARATION OF IMPURITIES FROM LIQUIDS BY CENTRIFUGAL FORCE.
APPLICATION FILED MAR. 13, 1914.

1,224,164.

Patented May 1, 1917.
2 SHEETS—SHEET 2.

Witnesses
Inventor
James Hamill
By B. Singer,
Attorney

UNITED STATES PATENT OFFICE.

JAMES HAMILL, OF HONOLULU, TERRITORY OF HAWAII.

SEPARATION OF IMPURITIES FROM LIQUIDS BY CENTRIFUGAL FORCE.

1,224,164.   Specification of Letters Patent.   Patented May 1, 1917.

Application filed March 13, 1914.   Serial No. 824,552.

*To all whom it may concern:*

Be it known that I, JAMES HAMILL, a citizen of the United Kingdom of Great Britain and Ireland, residing at Honolulu, in the county of Honolulu, Territory of Hawaii, have invented certain new and useful Improvements in the Separation of Impurities from Liquids by Centrifugal Force; and I do hereby declare the following to be a full, clear, and exact description of the invention, such as will enable others skilled in the art to which it appertains to make and use the same.

This invention relates to the separation of impurities from liquids by centrifugal force, and more particularly to methods and apparatus wherein the separation of impurities, which consist respectively of matters of greater and less density than the clear liquid, is effected while the liquid is in the form of a freely suspended rotating annular wall.

In the known methods, the separation of the light and the heavy impurities from the liquid takes place simultaneously and in one compartment, the impurities being retained therein, while the clarified liquid is discharged through a suitable opening, or the heavy impurities and the clarified liquid being drawn off into separate collecting chambers and discharged by means of separating pipes while the light impurities are discharged direct from the separation compartment by means of a scraping pipe.

According to the present invention, the impurities are separated from the liquid in two stages, the first stage consisting in the separation of the liquid and its impurities of a given range of density from the impurities of different density, and the second stage consisting in the separation of the liquid resulting from the first stage from the first mentioned impurities. Each separation is effected in a separate compartment, the impurities being retained in their respective compartments and discharged periodically or continuously with or without the rotation of the drum requiring to be stopped, while the clear liquid passes through each compartment and is continuously discharged.

In carrying out the present invention, the drum or container wherein the liquid is treated is divided into two compartments, which are preferably superimposed one above the other, and which are arranged in communication with each other as to the side of the first compartment where the clear liquid and one kind of its impurities are separated from the other kind. The division of the drum or container to form the two compartments is effected by means of a circular or annular shaped baffle plate, which is preferably inclined toward the inlet end of the container, and which serves to retain the impurities separated in the first compartment against passage into the second compartment. The bottom of each compartment is preferably downwardly inclined in order to facilitate the discharge of the impurities in the event of the rotation of the container being stopped. The plate forming the discharge end of the drum is preferably inclined in the direction of flow of the liquid. The discharge of the clear liquid may be effected by the provision of U-tubes adapted to rotate with the drum.

For periodically discharging the impurities, valves are provided, such for example as are described in my United States Patent No. 1,119,350 of December 1, 1914. These valves are arranged on the walls of the drum or container and are adapted to be operated by hydraulic pressure, being connected to a water reservoir formed at either or both ends of the drum. The discharge valves may be partly displaced or supplemented by the provision of an adjustable scraper or scrapers adapted to more or less continuously remove the lighter impurities from the inner surface of the annular wall of liquid. The impurities are discharged into an outer casing, the floor whereof is inclined to an outlet.

Means, such as blades or perforated baffle plates, may be employed to give a rotary motion to the liquid in the container, and also to guide the liquid through the drum in such a manner as to minimize the disturbance of the separated impurities. A test tube or test vessel may be arranged in connection with the discharge pipe for the clear liquid in order to permit of the ready inspection of the liquid coming from the machine.

Figure 2:
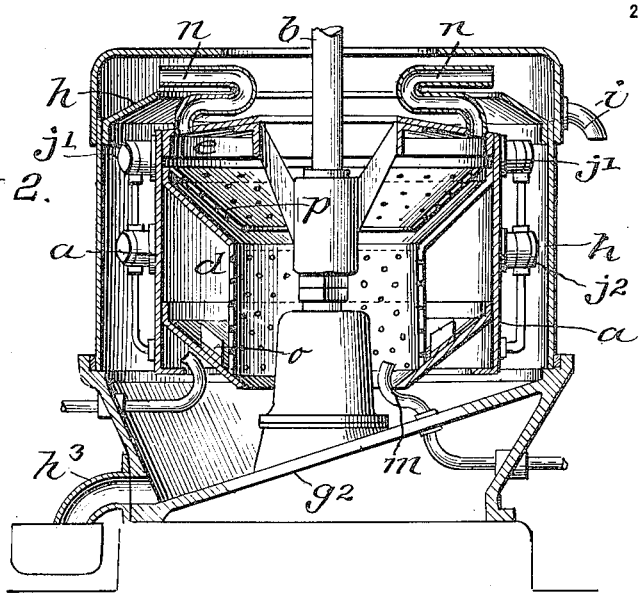
Figure 3:
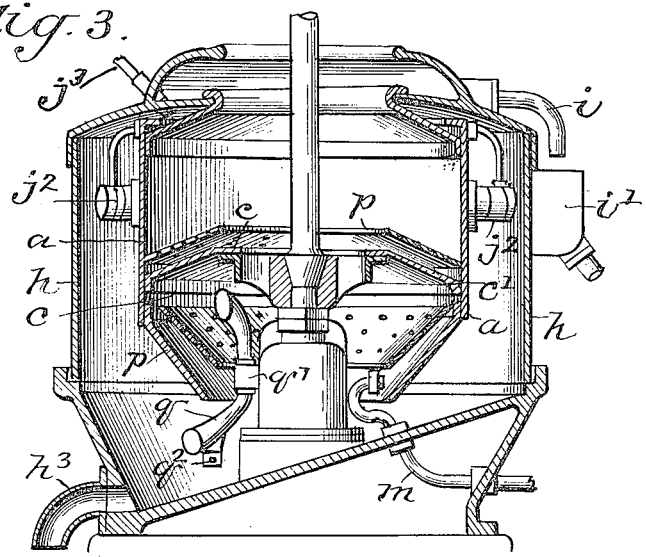
Figure 4:
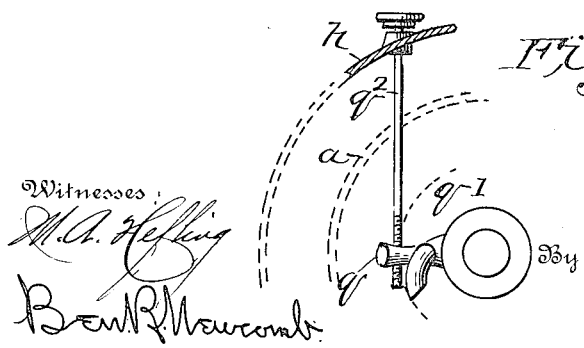

In the accompanying drawings, forming a part of this specification, Figure 1 is a sectional elevation illustrating one form of container constructed according to the present invention. Figs. 2 and 3 illustrate modifications of the container shown in Fig. 1. Fig. 4 is a plan view of one form of an adjustable scraper.

Referring to the construction of the separator shown in Fig. 1, the drum or container $a$ is formed at its lower end with a hollow boss $a'$ preferably shaped conical. Within this boss is housed the driving shaft $b$, while inlet ports $a^2$ are formed at the sides of the boss. Immediately in front of these ports is formed a projecting lip $a^3$ adapted to receive the liquid to be treated, which liquid is caused by centrifugal force to pass into the drum. The liquid may however be supplied to the drum in any other suitable manner. For instance, it may be introduced through the open top of the drum direct to the bottom thereof; the various separations being effected in its upward passage along the walls of the drum.

About midway of the drum is arranged a downwardly inclined annular baffle plate $c$, which divides the drum into two compartments $d$ and $e$ and which is adapted to retain the heavy impurities in the first compartment $d$ against upward passage through the drum. This baffle plate preferably terminates within the annular wall of liquid, but may, if so desired, be extended out of said wall and be provided with ports for allowing the liquid which still contains its light impurities to pass into the second compartment $e$. Toward the top of the drum is provided a second baffle plate or guide plate $f$, which extends out of said annular wall and which is preferably inclined in an upward direction. The clarified liquid is drawn off through a port or ports $f'$ formed near the outer edge of this second baffle or guide plate, and flows into an annular discharge chamber formed between the second baffle plate and the top plate $g$ of the drum. This top plate $g$ is also upwardly inclined and has its inner edge suitably turned or curved so as to overlap a downwardly inclined stationary plate $h'$ on to which the clarified liquid is discharged by centrifugal force. The stationary plate $h'$ projects from the outer casing $h$ of the machine and forms with the top of said casing an annular collecting chamber for the clarified liquid. The liquid is drawn off from the collecting chamber by means of a discharge pipe $i$ provided with a test tube $i'$ which allows of the ready inspection of the liquid. By regulation of the supply of liquid to be treated, a clear liquid can be obtained in the test tube $i'$. The top plate $g$ forms a reservoir $j$ for the purpose of collecting a supply of water to operate the valves $j'$ and $j^2$ for discharging the impurities; a water supply pipe $j^3$ supplying the said reservoir. The valves $j'$ and $j^2$ for discharging the impurities are connected by a pipe or pipes $j^4$ leading from the reservoir $j$. These valves discharge the impurities into the stationary outer casing $h$, the floor $h^2$ of which is inclined to the scum outlet or gutter $h^3$.

The drum $a$ may be driven by any suitable means, such as, for example, a water motor $k$ arranged on the shaft $b$ whereon may also be arranged a brake wheel $l$ or other suitable means for bringing the machine to rest.

In operation, the liquid to be treated, which for example in the case of sugar juice may first be sulfured, limed and heated or otherwise treated so as to be suitable for clarification by ordinary subsidence, is supplied to the rotary drum or container $a$. The heavy impurities owing to their greater specific gravity are impelled toward the walls of the drum $a$ and are retained in the first compartment $d$ while the juice or other liquid with its lighter impurities flows around the inner edge of the baffle plate $c$ into the second compartment $e$. In this latter compartment the juice is impelled to the wall of the drum leaving the lighter impurities behind at the inner wall of the liquid. The clear juice enters the annular discharge chamber by the port or ports $f'$ and overflows around the curved edge of the top plate $g$ into the annular collecting chamber.

As the impurities are retained in their respective compartments, the latter will, if the impurities be not discharged, become more or less filled with the same, and some of the light impurities will be discharged at the clear juice outlet. This impure discharge will be indicated in the test tube $i'$ and the supply of raw juice should at once be stopped and the valves $j'$ and $j^2$ for discharging the impurities opened by supplying water to the reservoir $j$. During this discharging operation the drum is kept rotating at ordinary speed.

The impurities may, however, be discharged through the open bottom of the drum, by stopping the rotation of the drum by means of the brake wheel $l$. For this purpose the bottom of each of the compartments is preferably downwardly inclined in order to facilitate the discharge.

After the impurities have been discharged, the drum may be cleaned by supplying water thereto, which, in the case of the drum being kept rotating, is discharged through the scum discharge valves. After the drum has been washed, the light impurities chamber or compartment $e$ is preferably half filled with previously clarified liquid simultaneously with or after the opening of the untreated juice supply pipe $m$. The clear juice is put in as a precaution against permitting the light impurities to enter the discharge passage for the clear juice and does not reduce the work of the machine as it can be filled in simultaneously with the supply of untreated juice.

The operation of the modification illustrated in Fig. 2 is similar to that described with reference to Fig. 1; in this however, the clear liquid is discharged by means of suitably shaped U-tubes $n$, which are fixed at or near the outer edge of the light impurities compartment $e$ and are bent radially inward toward the shaft to suit the depth of the annular wall of liquid. The reservoir $j$ for collecting the water is arranged at the bottom of the drum. The construction in Fig. 2 also shows the application of blades $o$ arranged in the lower compartment $d$ of the container for the purpose of giving rotation to the entering liquid. Blades of a similar construction may also be arranged in the upper compartment. Perforated plates $p$ may also be arranged in each compartment to guide the flow of the liquid for the purpose of preventing undue disturbance of the impurities already separated. These perforated plates may be loose or fixed to the drum, and if made in sections they may have angle joints which will tend to give rotation to the liquid entering the drum.

Another modification is illustrated in Fig. 3, according to which the light impurities are first separated, and thereafter the clear liquid is separated from the heavy impurities. In this construction the liquid to be treated is supplied at the bottom of the container and discharged at the top thereof into an annular collecting chamber. The light impurities are arranged in this instance to be continuously removed by means of an adjustable scraper pipe $q$ which is pivoted at $q'$ and is adapted to be brought into and out of the operative position by means of the screw-threaded rod $q^2$. Means may be provided for locking this scraper pipe in any adjusted position. These adjustable scrapers for light impurities may be used either alone or in conjunction with the scum discharge valves $j'$ and $j^2$ herein above mentioned.

The baffle plate $c$ dividing the drum $a$ into two compartments extends out of the wall of liquid and communication between the compartments is obtained by the port or ports $c'$ formed in said baffle plate at or near its outer periphery. Each compartment may also be fitted with blades $o$ and perforated guide plates $p$.

Of course, the two compartments for separating the light and the heavy impurities need not be superimposed one above the other, as shown, but may, if so desired, be arranged as separate containers driven from different shafts. The drum may also be arranged to rotate on a horizontal axis instead of on a vertical axis as shown.

Having thus described my invention, what I claim as new and desire to secure by Letters Patent is:—

In a centrifugal separator, in combination, a substantially cylindrical rotatable bowl having a central opening at top and bottom and a partition dividing the interior of said bowl into communicating compartments, said partition affording an exit passage for liquid from one compartment at a point differently spaced from the axis of rotation than the exit passage from the other compartment, said partition and bottom of said bowl lying on conical surfaces coaxial with said bowl permitting downflow of the contents of said compartment on cessation of the rotation of said bowl, and means for feeding the bowl at or near the bottom thereof.

In testimony whereof I affix my signature in presence of two witnesses.

JAMES HAMILL.

Witnesses:
SEYMOUR TERRY,
ROBT. J. PRATT.

Copies of this patent may be obtained for five cents each, by addressing the "Commissioner of Patents, Washington, D. C."